United States Patent [19]
Alberty

[11] Patent Number: 5,973,559
[45] Date of Patent: Oct. 26, 1999

[54] TRANSMITTER FOR HIGH FREQUENCY SIGNALS

[75] Inventor: Michael Alberty, Backnang, Germany

[73] Assignee: Robert Bosch GmbH, Stuttgart, Germany

[21] Appl. No.: 09/075,606

[22] Filed: May 11, 1998

[30] Foreign Application Priority Data

Jul. 14, 1997 [DE] Germany ............................ 197 30 086

[51] Int. Cl.$^6$ ..................................................... H03F 3/68
[52] U.S. Cl. ........................ 330/124 R; 330/53; 330/51; 455/69
[58] Field of Search ................................. 330/124 R, 53, 330/84, 107, 51, 295; 455/69, 126, 304

[56] References Cited

U.S. PATENT DOCUMENTS

| | | | |
|---|---|---|---|
| 3,375,458 | 3/1968 | Kelch | 330/124 R |
| 4,010,426 | 3/1977 | Rambo | 330/53 |
| 4,064,464 | 12/1977 | Morse | 330/124 R |
| 4,383,189 | 5/1983 | D'Oro | 327/361 |
| 5,222,246 | 6/1993 | Wolkstein | 330/107 |
| 5,287,543 | 2/1994 | Wolkstein | 330/124 R |
| 5,304,943 | 4/1994 | Koontz | 330/124 R |
| 5,831,479 | 11/1998 | Leffel et al. | 330/51 |

FOREIGN PATENT DOCUMENTS 0119514  9/1981  Japan ................................ 330/124 R

OTHER PUBLICATIONS

"Linear Amplification with Nonlinear Components", IEEE Transactions on Communication, Dec. 1974, pp. 1942–1945.

*Primary Examiner*—Robert Pascal
*Assistant Examiner*—Khanh Van Nguyen
*Attorney, Agent, or Firm*—Michael J. Striker

[57] ABSTRACT

The transmitter is built according to the LINC principle and has two parallel signal branches, each of which includes an amplifier (V1, V2) and a phase modulator (PM1, PM2). A dividing network (WE) is provided which divides the received signal (DI) between both signal branches and a combining device (KB) which adds the output signals (S11, S22) of both signal branches to form a sum signal (SS). In order to control the phase error in both signal branches the dividing network (WE) is designed so that the assignment of the received signal components (S1, S2) in both signal branches is periodically exchanged at a predetermined cycle frequency (fc). The amplitude modulation of the sum signal (SS) generated by the cyclic exchange of the input signal components (S1,S2) is detected and the phase depending on it in at least one of the signal branches is changed so that amplitude modulation is minimized.

7 Claims, 1 Drawing Sheet

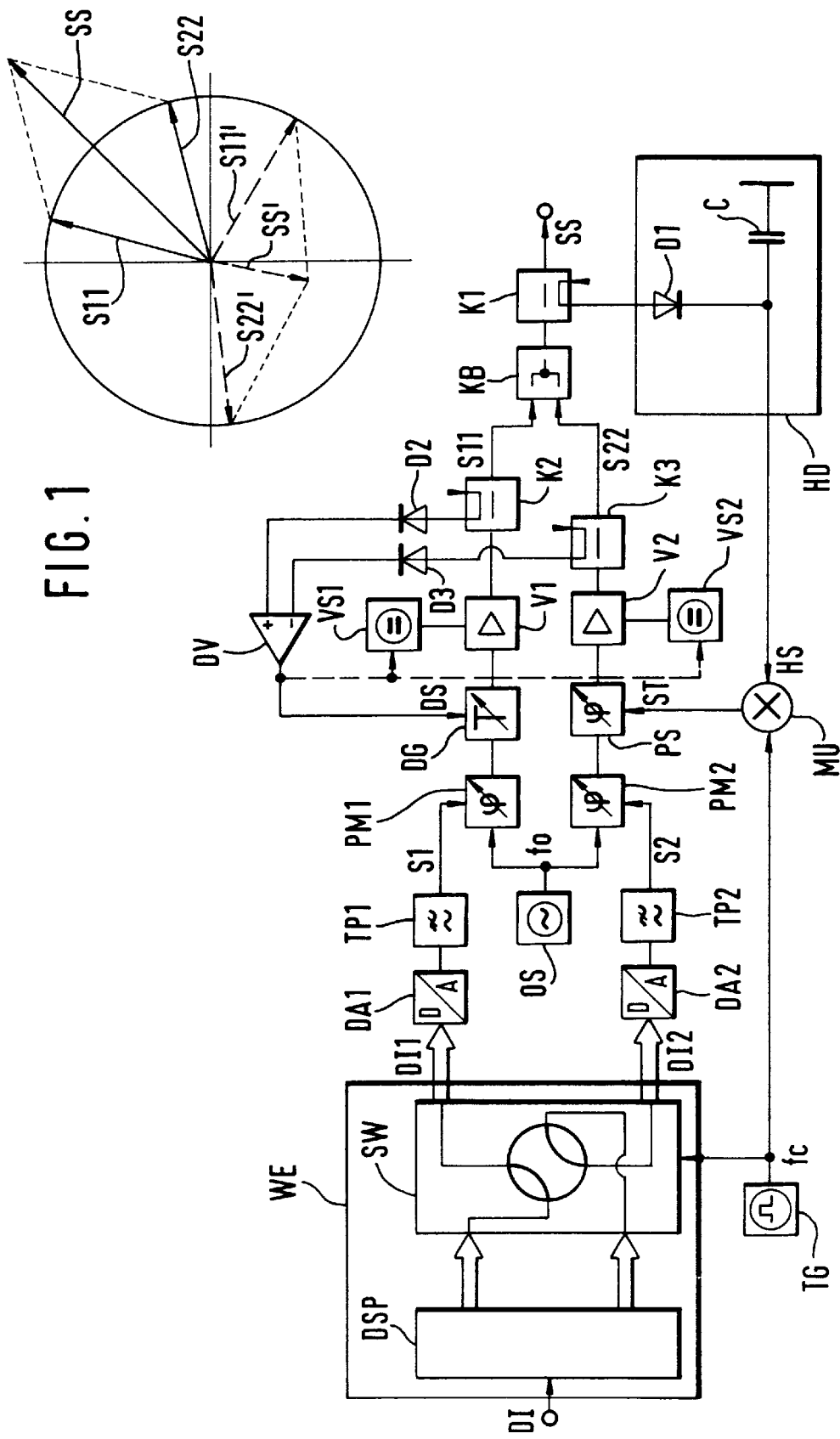

TRANSMITTER FOR HIGH FREQUENCY SIGNALS

BACKGROUND OF THE INVENTION

The present invention relates to a transmitter for high frequency signals, which has two parallel signal branches with respective phase modulators and amplifiers, in which a dividing network that divides a received signal into both signal branches and a combining device that combines the output signals from both signal branches into a single sum signal are provided.

The linearity requirements of transmitter amplifiers have become increasingly greater due to the growing use of high stage digital modulation methods (e.g. 64-QAM or 256-QAM) in communication. Transmitter amplifiers in current radios are operated well under their saturation power in order to avoid degradation of the transmitted signal by non-linear distortions. The required output-back-off (i.e. the ratio of average transmitted power to saturation power) amounts to more than 9 dB in 64-QAM systems. Since the peak values of the transmitted signals in these systems are up to about 9 dB over the average value, a strict linear transmission behavior for the transmission amplifier is required over this modulation region. In order to linearize the transmission behavior of the transmitter amplifiers, a predistorter can be used. Since however a complete linearization up to the saturation power is not attainable with reasonable effort in practice, a further back off of a few dB must be provided. Non-ideal transmission efficiency thus results because of the undesirable ratio of average transmitted power to saturation power. This leads to high transmitter power losses and also to correspondingly high component and thus manufacturing costs.

A process, in which the transmitter linearity requirements can be avoided up to saturation, is known in the literature under the name LINC (Linear Amplification with Nonlinear Components). A linearized transmitter operating according to the LINC principle is known from D. C. Cooks, "Linear Amplification with Nonlinear Components", IEEE-COM, December 1974, pp. 1942 to 1945.

As described therein, a transmitter operating according to the LINC principle has two parallel signal branches with respective phase modulators and amplifiers. An input side dividing network produces two control voltages from the received signal for both phase modulators so that a sum signal with the desired amplitude and phase is produced in an output side combining device. The vector diagram shown in FIG. 1 shows, for example, the form of two sum signals SS and SS'. The sum signal SS or SS' arises by addition of the output signals S11 and S22 or S11' and S22' of both signal branches. Both output signals S11 and S22 or S11 ' and S22' are phase modulated and contain no amplitude modulation. Because of this they can be brought to the desired signal level in both signal branches with two amplifiers operated in saturation, without the intermodulation products occurring. The output signals S11 and S22 or S11' and S22' are brought into an arbitrary phase relationship so that a sum signal SS or SS' is provided with any arbitrary phase and amplitude.

As the vector diagram in FIG. 1 shows the output signals S11 and S22 or S11' and S22' have equal amplitudes. A rotation of the signal state in a central region of the signal state diagram occurs, e.g. during an amplitude error, also during an opposite side variation of the amplitudes of both output signals. In contrast rotation of the entire signal-state-diagram grid is observed for large output signal amplitudes. A rotation or compression of the grid in the central region of the signal state diagram and a rotation of the signal state at the corner point occurs, above all, in a phase error, also a deviation of the phases of both output signals. If a deviation of the actual signal state from the set or desired signal state in the signal state diagram of less than 1% is desired, the amplitude error may not exceed 0.1 dB and the phase error may not exceed 1%. These prerequisites are not achieved with the known LINC transmitters, chiefly because the phase modulators in both signal branches have temperature and age-dependent phase changes. However all other components of the transmitter also have temperature and age-dependent changes which lead to amplitude and phase errors.

SUMMARY OF THE INVENTION

It is an object of the present invention to provide a transmitter of the above-described kind that produces a transmitter signal which produces deviations from the set amplitude and set phase which are as small as possible.

According to the invention, the transmitter for high frequency signals includes two parallel signal branches, each including a phase modulator and an amplifier;

a dividing network including means for dividing a received signal into received signal components fed to the respective signal branches and means for periodically exchanging an assignment of the respective signal components to the parallel signal branches at a predetermined cycle frequency (fc);

a combining device for combining output signals from both parallel signal branches into a sum signal; and means for detecting amplitude modulation of the sum signal generated by the periodic exchange of signal components and for changing a phase of the signal components in at least one signal branch according to the amplitude modulation so as to minimize the amplitude modulation.

The above-mentioned object is attained with the transmitter according to the invention because of the receiver or input side dividing network which is designed so that the assignment of the received signal components in both signal branches is exchanged periodically with a predetermined cycle frequency and because means are provided which detect the amplitude modulation of the sum signal generated by the cyclic exchange of the received signal components and change the phase in at least one of the signal branches according to it so that the amplitude modulation is minimized. Because of these features the signal phases in both signal branches are independent of temperature variation, of aging effects and amplitude errors.

In a preferred embodiment of the invention an envelope curve detector is provided which is supplied a part of the sum signal and a controllable phase shifter is provided in one signal branch. The control signal for the phase in one signal branch arises by multiplicative coupling of the amplitude modulation signal and the cycle frequency of the dividing circuit.

Furthermore detectors for the amplitudes of the output signals in both signal branches and means for controlling the amplitudes of both output signals according to the amplitude differences can be provided. Thus amplitude errors may be corrected. The means for controlling the amplitude difference can comprise a controllable damping member in at least one signal branch. The means for controlling the amplitude difference can also adjust the direct voltage operating point of at least one of both amplifiers.

It is appropriate to integrate the amplifiers of both signal branches in a single chip, whereby both amplifiers have approximately the same amplification temperature dependence. The amplitude synchronism between both amplifiers is improved because of that.

BRIEF DESCRIPTION OF THE DRAWING

The objects, features and advantages of the invention will now be illustrated in more detail with the aid of the following description of the preferred embodiments, with reference to the accompanying figures, in which:

FIG. 1 is a vector diagram for the output signal of a transmitter operating according to the LINC principle; and FIG. 2 is a block diagram of a transmitter according to the invention.

DESCRIPTION OF A PREFERRED EMBODIMENT

The vector diagram shown in FIG. 1, which describes the operation of a transmitter operating according to the LINC principle, has already been described previously in this specification.

The transmitter shown in FIG. 2 comprises two signal branches, in each of which an amplifier V1, V2 and phase modulator PM1, PM2 is arranged. Both amplifiers V1 and V2 are operated in or at least close to saturation and the signals are amplified in both signal branches to amplitudes which are as nearly equal as possible. A frequency conversion can be performed between the respective phase modulators PM1, PM2 and the amplifiers V1, V2. For this purpose both amplifiers V1 and V2 are integrated in a single chip, so that both are at temperatures which are as nearly equal as possible.

A dividing network WE that receives a digital input signal DI is located at the input of the transmitter. A digital signal processor DSP in the dividing network WE divides the input or received signal into two input signal parts DI1 and DI2. An ASIC with sin-/cos- tables can be used instead of a digital signal processor. Connected respective digital/analog converters DA1 and DA2 and following low pass filters TP1 and TP2 form two respective analog received signal components S1 and S2, which are fed to respective phase modulators PM1 and PM2 in both signal branches. Both phase modulators PM1 and PM2 receive a signal of frequency f0 from a carrier frequency oscillator OS. The digital signal processor DSP derives digital input signal components DI1 and DI2 from the digital input signal DI, which produce those portions of the output signals S11 and S22 of both signal branches which are required for formation of a desired output signal SS of the transmitter. The analogous input signal components S1 and S2 thus control both phase modulators PM1 and PM2 so that both output signals S11 and S22 have the phase relationship required for a desired output signal SS.

Since the phase modulators PM1 and PM2 in practice have temperature- and age-related phase changes, the following features are provided in order to control phase errors. A switch SW that is controlled by a control signal at frequency fc provided by a frequency generator TG located at the input side dividing network WE periodically switches both input signal components S1 and S2 between the phase modulators PM1 and PM2. As soon as the phase relationships of the output signal components S11 and S22 deviate from their set values, the sum signal SS experiences a rectangular amplitude modulation synchronized at the frequency fc, whose level corresponds to the phase error. A part of the sum signal SS is decoupled by means of a coupler K1 and fed to an envelope curve detector HD comprising a diode D1 and a condenser C. The output signal HS of the envelope curve detector HD is a measure of the amplitude modulation of the sum signal SS, which is called for by the phase error. A phase shifter PS is added to one of both signal branches, whose phase is now adjusted so that the phase error vanishes. A control signal ST for the phase shifter PS corresponds to the envelope curve signal HS. It is suitable to use the product formed by a multiplier MU from the envelope curve signal HS and the cycle frequency fc as the control signal ST for the phase shifter PS. Because of that the control signal ST has the correct polarity for feedback to the phase shifter PS. All phase errors, which result from a temperature fluctuations, age effects or amplitude errors, are controlled.

If the amplitudes of the output signals S11 and S22 should deviate from each other, also if an amplitude error is present, thus the following features are provided. A signal part is decoupled from each output signal S11 and S22 of both signal branches by couplers K2 and K3 and rectified by means of diodes D2 and D3. Thus one obtains a measure of the amplitudes of both output signals S11 and S22. A difference amplifier DV measures the difference between the amplitudes of both output signals S11 and S22. This amplitude difference is formed as a control signal DS for a damping member DG added to one of the two signal branches. The amplitude of both output signals S11 and S22 may be balanced or equalized to each other with this controllable damping member DG. Another possibility for control of the amplitude error is to adjust the supply voltages VS1 and VS2 for both amplifiers V1 and V2 with the output signal of the difference amplifier DV so that the output signals of both amplifiers V1 and V2 have the same amplitudes. This direct current operating point control is better than using the damping member in regard to the efficiency of the transmitter.

Alternatively to the above-described embodiment phase modulation that changes the phase and amplitude by means of a digital processor could be used.

The disclosure of German Patent Application 197 30 086.3 of Jul. 14, 1997, is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in a transmitter for a high frequency signals, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A transmitter for high frequency signals, said transmitter comprising
    two parallel signal branches, each including a phase modulator (PM1, PM2) and an amplifier (V1, V2);
    a dividing network (WE) including means for dividing a received signal into received signal components (S1, S2) fed to the respective signal branches to form output signals (S11, S22) and means for periodically exchanging an assignment of said signal components (S1, S2) to the respective parallel signal branches at a predetermined cycle frequency (fc);

a combining device (KB) for combining the output signals (S11, S22) from both of said two parallel signal branches into a sum signal (SS); and means (HD, PS) for detecting amplitude modulation of the sum signal (SS) generated by periodic exchange of said signal components (S1, S2) and for changing a phase of said signal components in at least one of the signal branches according to the amplitude modulation so as to minimize said amplitude modulation.

2. The transmitter as defined in claim 1, wherein the means (HD, PS) for detecting the amplitude modulation and for changing the phase relationship comprises an envelope curve detector (HD) that is supplied a part of said sum signal (SS) and a controllable phase shifter (PS) in one of the signal branches.

3. The transmitter as defined in claim 1, further comprising means for forming a control signal (ST) for said phase in one of the signal branches by multiplicative coupling of the amplitude modulation signal (HS) and the cycle frequency (fc).

4. The transmitter as defined in claim 1, further comprising detector means (D2, D3) for amplitudes of both of said output signals (S11, S22) in both of the signal branches and means (DV, DG) for controlling an amplitude difference between said amplitudes of said output signals.

5. The transmitter as defined in claim 4, wherein the means for controlling the amplitude difference comprises a controllable damping member (DG) arranged in at least one of said signal branches.

6. The transmitter as defined in claim 4, wherein the means for controlling the amplitude difference comprises means for adjusting a direct current operation point of one of said amplifiers (V1, V2).

7. The transmitter as defined in claim 1, wherein both of said amplifiers (V1, V2) are integrated together in a single chip.

* * * * *